Dec. 18, 1923.
B. J. WHITCOMB
1,478,156
SOLID TREAD PNEUMATIC TIRE
Filed July 2, 1921
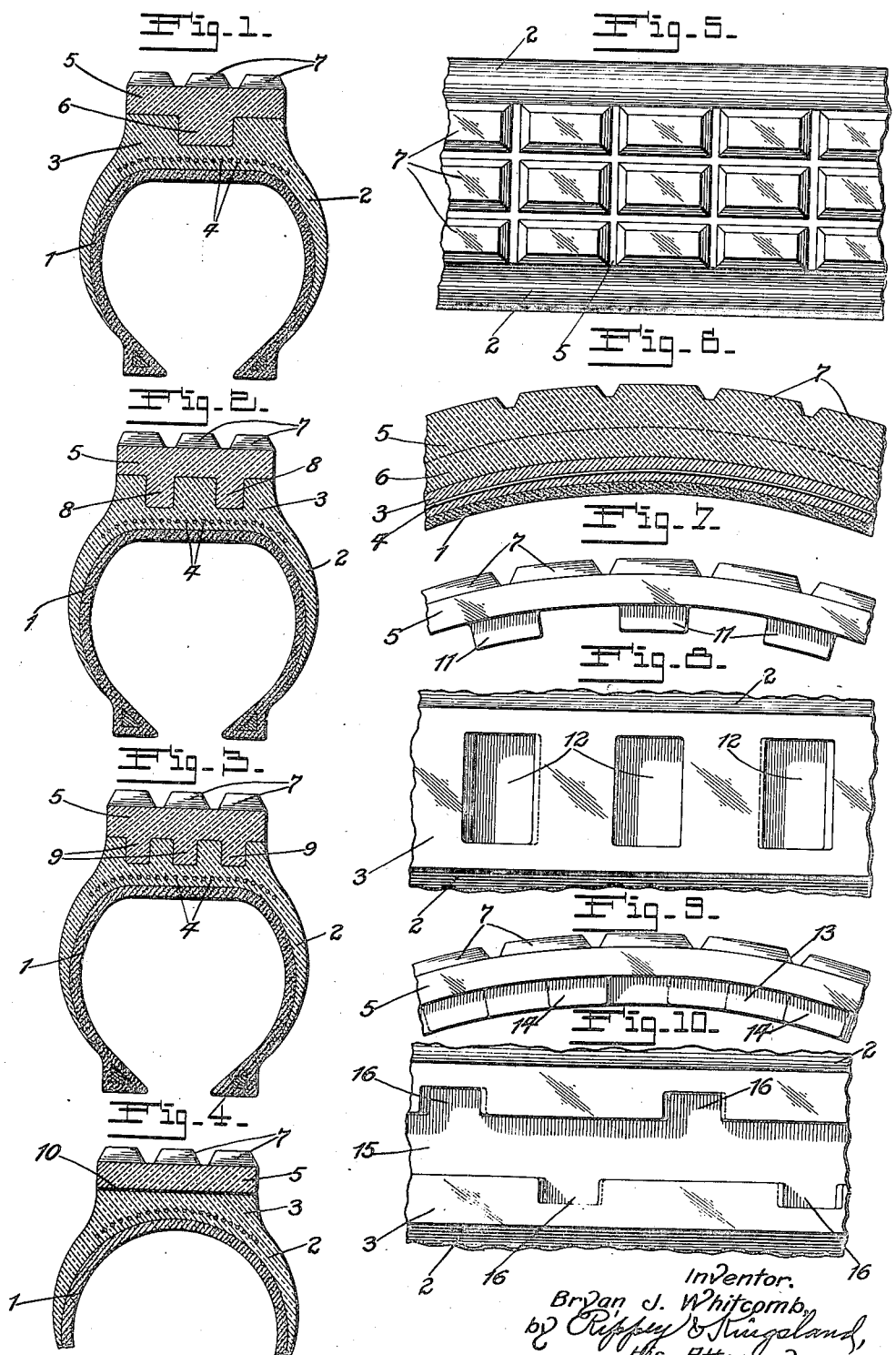
Inventor.
Bryan J. Whitcomb,
by Rippey & Kingsland,
His Attorneys.

Patented Dec. 18, 1923.

1,478,156

UNITED STATES PATENT OFFICE.

BRYAN J. WHITCOMB, OF ST. LOUIS, MISSOURI.

SOLID-TREAD PNEUMATIC TIRE.

Application filed July 2, 1921. Serial No. 482,062.

*To all whom it may concern:*

Be it known that I, BRYAN J. WHITCOMB, a citizen of the United States, residing at St. Louis, Missouri, have invented a new and useful Solid-Tread Pneumatic Tire, of which the following is a specification.

This invention relates to solid tread pneumatic tires.

The invention has special reference to pneumatic tires in which the tire proper is characterized by a wide and solid tread-receiving portion, in combination with a solid tire tread characterized by a solid thick portion of the full width of the tread-receiving portion of the tire, and means for securing the two parts together in proper relationship.

An object of the invention is to provide an improved tire constructed and characterized as stated and as hereinafter described.

Another object of the invention is to provide an improved solid rubber tread or demountable outer tire, with means for securing the same in proper relationship to the solid tread-receiving portion of the tire proper, with means that may be optionally employed to prevent the outer tire or tread from turning relative to the tire proper.

Another object of the invention is to provide a tire constructed and characterized as stated, in which the outer solid tire or tread when detached from the tire proper is of smaller diameter so that when it is applied to the tire proper it is stretched and will contract with proper elasticity upon the pneumatic tire proper forming an interlocking connection holding the two parts together as if formed integrally.

Various other objects will appear from the following description of the invention, reference being made to the accompanying drawing in which—

Fig. 1 is a cross sectional view of one form of the invention in which the tire body has a single circumferential groove receiving a continuous flange on the tread.

Fig. 2 is a cross sectional view of another form of the invention in which the tire body has two circumferential grooves receiving two continuous flanges on the tread.

Fig. 3 is a cross sectional view of still another variation of the invention in which the tire body has three circumferential grooves receiving three continuous flanges on the tread.

Fig. 4 is a cross sectional view showing a form of the invention in which the interlocking ribs are omitted.

Fig. 5 is a view showing a portion of the periphery of the tread of preferred form.

Fig. 6 is a longitudinal sectional view thereof showing the continuous flange on the tread extending into the groove in the tire body.

Fig. 7 is a side elevation of a form of outer tire or tread in which the inner side of the tread is provided with a circumferential series of lugs for engagement in a circumferential series of recesses in the tire.

Fig. 8 is a view showing a part of the outer periphery of the inner tire to which the tread shown in Fig. 7 is applied.

Fig. 9 is a side elevation of another form of tread in which the tread is provided with an inside circumferential flange having lateral projections on each side.

Fig. 10 is a view showing a part of the periphery of the inner tire to which the tread shown in Fig. 9 may be applied.

The combination tire shown in Figs. 1, 2, 3 and 4 includes a tire body comprising an inner part 1 of fabric, cord or the like, to which the outer rubber body 2 is vulcanized, or cemented or otherwise secured. The outer circumferential part 3 of the rubber is relatively of much greater thickness than the remaining portion and has imbedded therein a breaker strip 4 which is preferably of fabric, or cord, or the like.

In the form of the invention shown in Fig. 1 the outer tire 5 is of solid rubber. The solid rubber outer tire 5 is elastic, but the inside diameter thereof is somewhat smaller than the outside diameter of the tire proper so that it is necessary to stretch or expand the outer tire in order to apply it to the tire proper. The main portion of the outer tire 5 is approximately of uniform thickness throughout its width, and the width thereof is the same as the width of the thick portion 3 of the tire proper to which it is applied. The outer tire 5 is formed with an internal rib or flange 6 arranged to be received within a circumferential groove in the solid portion 3 of the tire proper. The flange or rib 6 is of relatively narrow cross sectional width so that wide portions of the tire proper are at the sides thereof. This construction provides a tire that is strong and durable and in which the outer tire or tread is bound and firmly held in connection with the tire proper by the contractile tendency thereof.

In each form of the invention the outer tire or tread is of the non-skid design having raised portions 7 thereon. In each case the construction is such that the entire width of the outer tire or tread is utilized for traction.

In the form shown in Fig. 2 the construction is the same as that already described, with the exception that the outer tire or tread 5 is provided with two ribs or flanges 8 spaced apart and received within corresponding grooves in the periphery of the outer solid portion 3 of the tire proper.

The construction shown in Fig. 3 is the same as the structures already described, with the exception that the outer tire or tread is provided with three spaced ribs or flanges 9 instead of a single one as in Fig. 1, and instead of the two flanges as in Fig. 2.

In the construction shown in Fig. 4 the outer tire or tread 5 is not provided with any ribs or flanges, nor is the outer thick portion 3 of the tire proper provided with grooves or recesses. The outer tire or tread 5 in Fig. 4 is bonded with the tire proper through the medium of an interposed circumferential band or layer 10 of fabric which is vulcanized, or cemented or otherwise secured both to the tire proper and to the outer tire or tread.

In the construction shown in Figs. 7 and 8 the outer tire or tread 5 is formed with a circumferential series of lugs or projections 11 extending inwardly and are adapted to be received in recesses 12 provided therefor in the outer surfaces of the solid thick portion 3 of the tire proper. This construction provides a positive lock preventing the outer tire or tread from slipping upon the tire proper.

In the construction shown in Figs. 9 and 10 the outer tire or tread 5 is provided with an inside circumferential flange or rib 13 having a series of lateral projections 14 on each side. The rib 13 is received within a circumferential groove 15 in the thick solid portion 3 of the tire proper, while the projections 14 are received within notches 16 formed in the side walls of the groove 15. This construction likewise forms a positive lock preventing the outer tire or tread from turning or slipping relative to the tire proper.

In each embodiment of the invention in which the tire body is provided with circumferential grooves or recesses, the width of the single groove in Figs. 1 and 10, the combined width of the grooves in Figs. 2 and 3, and the combined area of the recesses in Fig. 8 is less than the combined width of the surface portions of the tire between which the grooves and recesses are formed. The tread is of homogeneous solid rubber, whose internal diameter is less than the external diameter of the tire body so that the tread exerts a compression against the periphery of the tire body all around.

From the foregoing it is apparent that my invention accomplishes all of its intended objects and purposes. The outer tire or tread being provided with a flat tread surface and being of about equal thickness throughout its width obtains better traction than is obtained by tires in which the outer tread surface is rounded in cross section.

I do not restrict myself to unessential particulars, nor otherwise, except as set forth in the appended claims.

What I claim and desire to secure by Letters Patent, is:—

1. In a tire of the character described, the combination with a pneumatic tire body having a thick circumferential portion, the outer surface of which is flat in cross section and the side walls of which are at right angles to the outer surface at their intersection therewith, the circumferential portion being provided with a groove having side walls at right angles to the outer surface of the tire body and said groove being of less width than the combined width of the remaining portions of the circumferential portion of the body; of a thick, solid, homogeneous rubber expansible and contractible elastic tread having a width equal to the width of said flat surface and having side walls in continuation of the side walls of the tire body, and having an inside diameter smaller than the outside diameter of the flat surface of the tire body; and a homogeneous rubber flange integral with the inside of the tread engaging in said groove, and said tread and flange being expanded on the tire body and exerting inward pressure against the tire body by the elasticity of the homogeneous rubber tread and flange.

2. In a tire of the character described, the combination with a pneumatic tire body having a thick circumferential portion, the outer surface of which is flat in cross section and the side walls of which are at right angles to the outer surface at their intersection therewith, the circumferential portion being provided with a groove having side walls at right angles to the outer surface of the tire body and having notches therein and said groove being of less width than the combined width of the remaining portions of the circumferential portion of the body; of a thick, solid, homogeneous rubber expansible and contractible elastic tread having a width equal to the width of said flat surface and having side walls in continuation of the side walls of the tire body, and having an inside diameter smaller than the outside diameter of the flat surface of the tire body; a homogeneous rubber flange integral with the inside of the tread engaging in said groove, and said tread and flange being expanded on the tire body and exerting inward pressure against the tire body by the elasticity of the homogeneous rubber tread and flange; and projections on the side edges of said flange in relative staggered arrangement engaging in said notches in the side walls of said groove and holding the tread from turning relative to the tire body.

BRYAN J. WHITCOMB.